(No Model.)

J. M. HUTSON.
UNIVERSAL PLANTER AND CULTIVATOR.

No. 324,938. Patented Aug. 25, 1885.

WITNESSES
Fred. Heller.
Parker H. Sweet Jr.

INVENTOR
James M. Hutson,
By L. Bingham,
Attorney

UNITED STATES PATENT OFFICE.

JAMES MADISON HUTSON, OF HARPERSVILLE, MISSISSIPPI.

UNIVERSAL PLANTER AND CULTIVATOR.

SPECIFICATION forming part of Letters Patent No. 324,938, dated August 25, 1885.

Application filed October 17, 1884. (No model.)

*To all whom it may concern:*

Be it known that I, J. M. HUTSON, of Harpersville, in the county of Scott and State of Mississippi, have invented certain new and useful Improvements in Universal Planters and Cultivators; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to improvements in that class of combined cultivators and seed-planters in which the seed-planting mechanism may be removed at pleasure to convert the apparatus into a cultivator; and my improvements consist, essentially, in certain novel details of construction and general arrangement of parts, all as will be hereinafter fully described, and specifically pointed out in the claim.

Figure 1:
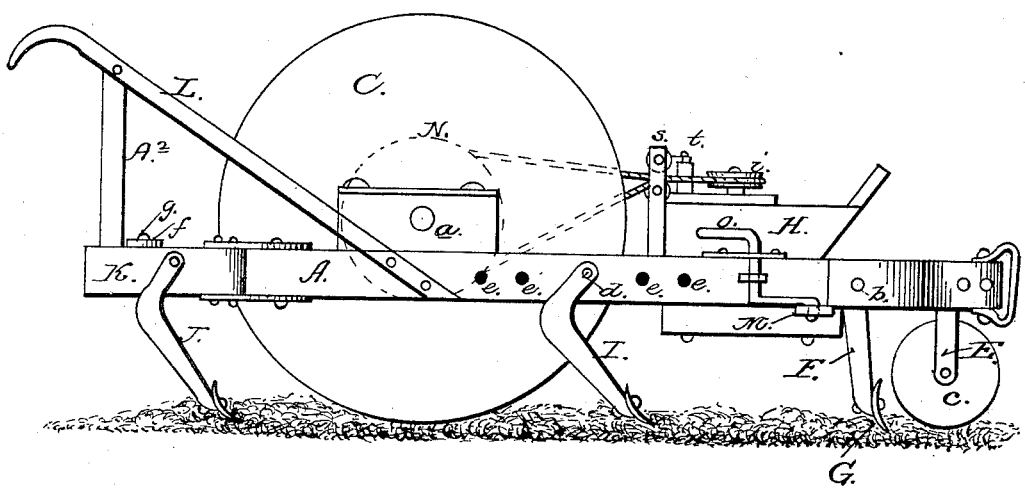
Figure 2:
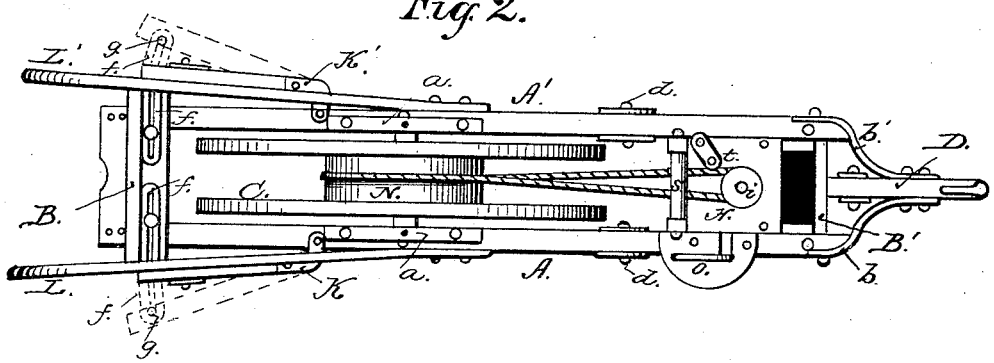
Figure 3:
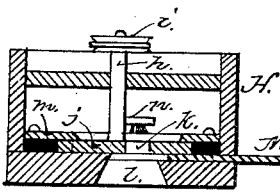

In the accompanying drawings, Figure 1 represents a side elevation of my improved invention; Fig. 2, a top plan view of the same, and Fig. 3 a detail sectional view thereof.

Similar letters of reference occurring on the several figures indicate like parts.

Referring to the drawings, A A' represent the two side beams or frame of my improved mechanism, which are connected together at the front and rear by the cross-beams B B', a suitable wheel, C, being adjusted at the central part of the frame upon suitable bearings, $a$, as shown. A draft-beam, D, projects forward from the central part of the front cross-beam, B', and is supported in place by means of the iron braces $b$ $b'$, while a beam, E, carrying a disk or roller, $c$, extends downwardly from the rear of the draft-beam D, as shown in Fig. 1.

Depending from the cross-beam B' is arranged a suitable beam, F, carrying the front central plow or colter, G, while immediately in the rear of the seed box or hopper H are two similar plows, I I', one on each of the side beams, A A'. The beams or standards carrying the said plows I I' lap over the side beams, A A', in such manner that they may be adjusted forward or back upon the central part of said beams by means of the pin $d$ through the same engaging with one of the series of holes $e$ in the sides of the beams A A', as fully shown in Fig. 1.

At the rear of the main frame are provided extension-wings K K', which are hinged to the side beams, A A', and provided with plows J J', a sliding bar, $f$, and thumb-screw $g$ (shown in dotted lines in Fig. 2) enabling the wings to be moved outwardly and back to adjust the plows to the desired angle, according to the nature of the soil and conditions of planting or cultivating. Suitable handles, L L', are attached to the side beams, A A', and to the rear upright, $A^2$, to control and guide the apparatus. The seed box or hopper H is located upon the frame immediately in front of the wheel C, and is provided with a central vertical staff, $h$, carrying a pulley, $i$, upon its top, and a disk, $j$, upon its bottom. The disk $j$ is provided with one or more holes or openings, $k$, which correspond to the discharge hole or opening $l$ in the bottom of the hopper. A circular flange, $m$, rests upon the said disk to relieve it from the weight of the seed or grain to allow it to revolve freely. A small brush, $n$, is attached to the lower part of the vertical staff $h$, to regulate the supply of seed to the discharge-opening.

Projecting through the lower side of the hopper H is arranged a slide, M, which is operated by the crank $o$ to open or close the discharge-opening at pleasure. A belt passes from the pulley N on the wheel C over the friction-rollers $s$ $t$, on the top of the hopper H, and around the pulley $i$, on the top of the vertical staff $h$, to revolve the seed-distributing mechanism.

In the operation of my invention the front plow, G, opens the furrow, into which the seed is dropped from the discharge-opening of the hopper, and the plows I I' and J J' cover the seed as the machine is propelled forward.

When the device is to be used as a cultivator, the seed-hopper H and the wheel C may be readily removed from the frame and the plows set at the desired angle, according to the nature or character of the work.

My improved apparatus is equally adapted for the sowing of fertilizing material, in which case the revolving disk and vertical staff are removed and a staff carrying stirring-blades substituted in place thereof.

Having thus described my invention, what I claim as new and useful is—

In combined planters and cultivators, the frames A A', connected by cross-beams B B', the beam B' maintaining both the horizontal draft-pole D and the vertical plow-support F in position, the beam B performing a similar staying function for the handle-support A² and for the adjustable wings K K', from which plows J J' depend, the said frames A A' supporting centrally-adjustable plows I I', and the wheel c, in combination with the removable wheel C, mounted in bearings a a, and having a pulley, N, on the same shaft, the standard having contiguous friction-rollers s t thereon, and the detachable seed-box H, having shaft h, provided with pulley i, brush n, and disk j, having also flange m and perforations k l, adjustable slide M, and crank o, the whole co-operating in the manner and for the purpose set forth.

In testimony that I claim the foregoing as my own I affix my signature in presence of two witnesses.

JAMES MADISON HUTSON.

Witnesses:
J. S. SCOTT,
S. C. SCOTT.